United States Patent [19]

Avitan

[11] Patent Number: 5,070,283
[45] Date of Patent: Dec. 3, 1991

[54] TRACTION MOTOR CONTROLLER FOR FORKLIFT VEHICLES

[75] Inventor: Isaac Avitan, Vestal, N.Y.

[73] Assignee: Raymond, Greene, N.Y.

[21] Appl. No.: 519,987

[22] Filed: May 7, 1990

[51] Int. Cl.$^5$ ............................................. H02P 7/06
[52] U.S. Cl. .................................... 318/139; 318/493; 388/803
[58] Field of Search ................ 318/139, 255, 256, 257, 318/268, 493, 494; 388/800, 801, 802, 803, 809, 810

[56] References Cited

U.S. PATENT DOCUMENTS

| | | | |
|---|---|---|---|
| 4,079,301 | 3/1978 | Johnson, III | 388/803 |
| 4,196,377 | 4/1980 | Boxer | 318/269 |
| 4,410,842 | 10/1983 | Owen | 318/139 |
| 4,422,022 | 12/1983 | Hill et al. | 318/376 |
| 4,475,070 | 10/1984 | Wilkerson | 318/405 X |
| 4,484,117 | 11/1984 | Bose | 318/493 X |
| 4,549,122 | 10/1985 | Berkopec et al. | 388/806 |
| 4,801,855 | 1/1989 | Nohmi et al. | 318/268 X |
| 4,845,413 | 7/1989 | Hackl et al. | 388/802 |

Primary Examiner—Bentsu Ro
Attorney, Agent, or Firm—Salzman & Levy

[57] ABSTRACT

A system for controlling separately excited shunt-wound dc motors, where control is achieved through microprocessor-based independent PWM control of a chopper (armature) and an H-bridge (field). Connected to the armature is an armature voltage amplifier for varying the applied armature voltage. A field voltage amplifier is also provided for determining the direction of motor rotation and varying the voltage applied to the field winding. A first sensor is connected to the motor armature in order to determine the motor rotational speed. A second sensor is connected to the armature circuit in order to determine the armature current. A third sensor is connected to the field circuit in order to determine the field current. A decoupling controller uses the motor speed and armature current information, and adjusts the armature voltage and the field voltage. An optimal controller uses the motor speed, field current and armature current information, and adjusts the armature voltage and the field voltage.

10 Claims, 5 Drawing Sheets

TRACTION MOTOR CONTROLLER FOR FORKLIFT VEHICLES

RELATED APPLICATION

The present application is related to U.S. patent application Serial no. 07/519,988, filed concurrently herewith for "TRACTION MOTOR OPTIMIZING SYSTEM FOR FORKLIFT VEHICLES".

BACKGROUND OF THE INVENTION

The present invention relates to dc motor controllers and, more particularly, to control systems for dc motors having separately excited armature and field windings.

Material handling trucks fall into one of several power plant categories. One such category is the electric vehicle, the energy source for which is a lead-acid battery that can weigh many thousands of pounds. Besides providing the energy source to the vehicle, in many instances the battery also provides vehicle counterbalance.

The ratio of the load weight to the gross unloaded vehicle weight of industrial lift trucks is extremely important. For example, if an unladen vehicle weighs 12,000 lbs, and the maximum load weight it can carry is 4,000 lbs, then the gross unladen/laden weight may vary from as little as 12,000 to as much as 16,000 lbs. This represents a change of 33% in motor torque requirements. Moreover, the vehicle must be able to maneuver on loading ramps, further increasing the motor torque requirements. For these and other reasons, it is desirable to have a control system capable of extracting precise and efficient work from the vehicle.

The main motive element of this type of vehicle, referred to as the traction system, conventionally consists of a series-wound dc motor coupled to a gear reducer and drive wheel. Some electric vehicles utilize a single "steer-drive" traction system, while others employ a "dual-drive" (differential) traction system.

The rotational direction of the series-wound dc motor is controlled by the polarity orientation of the field winding with respect to the armature. Under conventional control, the field winding orientation is controlled through a pair of contactors, such that when power is applied across the field-armature combination, the motor is caused to rotate in the desired direction.

The series-wound dc motor, heretofore used extensively in industrial lift trucks, displays one very important characteristic: it has extremely high torque at zero speed. This is extremely important, because it provides the necessary starting torque.

Under conventional control, the field-armature combination is controlled as a single unit. Motor speed regulation is achieved through voltage switching typically utilizing such power semiconductor technologies as silicon-controlled-rectifiers (SCR). The voltage drop associated with the SCR as well its duty cycle limit impose a speed limit on the motor. To extract the maximum speed from the motor and reduce overall system power loss, a bypass contactor is utilized across the SCR, thereby placing the motor's field-armature combination in series with the battery.

Under such a control scheme, however, the series dc motor does have one major drawback: it may operate only along its characteristic commutation curve limit. This results in motor speed variations due to changing torque loading arising from variations in load capacities, travel path conditions and grade variations.

With the proper controls, the use of a shunt-wound dc motor under independent field and armature control can provide distinct advantages over conventional series-wound dc motors for lift truck applications. The control method of the present invention provides the shunt-wound dc motor with the ability to simulate a series-wound dc motor, hence developing the necessary starting torque.

The separately excited dc motor represents a highly coupled multi-input, multi-output, non-linear, dynamic system or plant. It is highly coupled in the sense that, when one of its inputs is changed, all of the outputs are affected. This is undesirable, since the purpose of control is to knowingly and intentionally affect the desired output(s) only, without altering other output states.

U.S. Pat. No. 4,079,301 issued to Johnson, III discloses a dc motor control circuit having separately excited armature and field windings. The control circuit is operable in both the constant torque and constant horsepower modes. The transfer characteristics of the circuit provide high gain at low frequencies and low gain at higher frequencies. The circuit can further reduce the gain at low frequencies when motor operation switches from the constant torque mode to the constant horsepower mode.

U.S. Pat. No. 3,694,715 issued to Van Der Linde et al. discloses a contactless dc motor reversing circuit. The current from a variable frequency, pulsed dc source is applied to the series field by a pair of solid state switching devices for forward motor rotation. A second pair of solid state switching devices applies current for reverse motor rotation. Common to both switching devices is a third switching device which normally carries the induced armature current between pulses. It is de-energized during transfer of conduction between both pairs of switching devices, assuring that the blocking state of one pair occurs before the second pair is turned on.

U.S. Pat. No. 4,264,846 issued to Sauer et al. discloses a speed control braking circuit for a dc motor. The field and armature currents are independent of each other to allow motor operation in the field weakening region. The armature current is set by a pulsing dc element. The field winding is contained in a series circuit with a switch which is connected in parallel with the dc element. Shunted across the field winding is a field current bypass diode.

It would be advantageous to provide a motor control system capable of producing variable torque while maintaining constant speed.

It would also be advantageous to provide a system in which the characteristics of a series-wound dc motor could be simulated using a shunt-wound dc motor.

It would further be advantageous to provide a system in which a traction motor's field and armature windings are separately excited and controlled.

It would also be advantageous to provide a system in which the motor can be controlled by a decoupling controller.

It would still further be advantageous to provide a system in which the decoupling controller is achieved using software.

SUMMARY OF THE INVENTION

Independent field and armature control enables control of a motor anywhere along, and below its characteristic commutation curve limit. While a bypass contactor may be employed across the armature voltage switching device to reduce power losses, independent field control extends controllability of the motor, thereby making the system less sensitive to variations in load capacities, travel path conditions and grad variations.

A shunt-wound dc motor is the main motive mechanism replacement for the traditional series-wound dc motor. The shunt-wound dc motor's field windings require far less current than its series-wound counterpart, thereby making it economically feasible to apply full variability (voltage switching) field control.

Field and armature voltage switching is achieved through the utilization of power transistors as opposed to the traditional SCR's. Although SCR's provide an inexpensive means of voltage switching, they are limited in switching speed and require additional circuitry due to their non-self-commutating characteristics.

In accordance with the present invention, there is provided a system for controlling separately excited shunt-wound dc motors, where control is achieved through microprocessor-based independent pulse-width-modulation (PWM) control of a chopper (armature) and an H-bridge (field). Connected to the armature is an armature voltage amplifier for varying the applied armature voltage. A field voltage amplifier is also provided for varying the voltage applied to the field winding. A first sensor is connected to the motor armature in order to determine the motor rotational speed. A second sensor is connected to the armature circuit in order to determine the armature current. A third sensor is connected to the field circuit in order to determine the field current. A decoupling controller uses the motor speed and armature current information and adjusts the armature voltage and the field voltage.

The use of such a system results in many benefits including, but not limited to, precise velocity control, precise torque control, optimized efficiency, increased performance, increased reliability and decreased cost-of-ownership.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Before describing the preferred embodiment of the present invention, it is desirable to discuss briefly the speed-torque characteristics of a series-wound dc motor.

Figure 1:
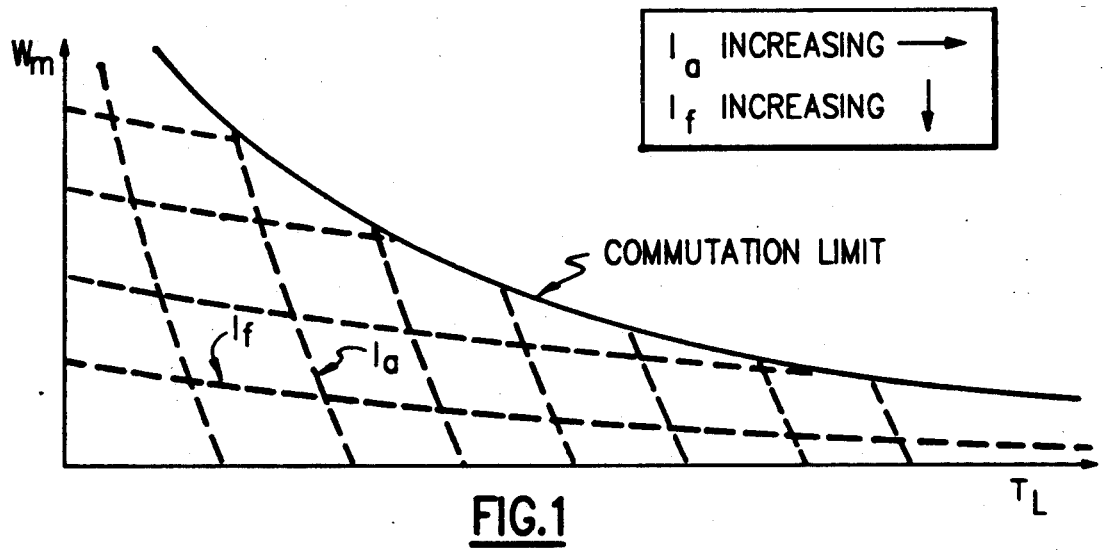
FIG. 1 is a graphical representation of a typical speed-torque relationship for series-wound dc motor.

Referring now to FIG. 1, there is shown a typical speed-torque graph for a series-wound dc motor showing the characteristic commutation limit, field current $I_f$ lines, and the armature current $I_a$ lines.

As discussed above, under conventional control a dc motor is restricted to operation along its characteristic commutation limit as represented by the motor rotational speed $W_m$ and motor shaft torque loading $\tau_L$. Hence, as can be seen from FIG. 1, a change in $\tau_L$ results in a change in $W_m$.

However, under independent and fully variable field and armature control, a change in $\tau_L$ may not necessarily result in a change in $W_m$. Rather, a control system in accordance with the present invention, and described in greater detail hereinbelow, can select a new motor operating point through $I_a$ and $I_f$ under the commutation limit resulting in an unchanged $W_m$ for the new torque loading value $\tau_L$.

Figure 2:
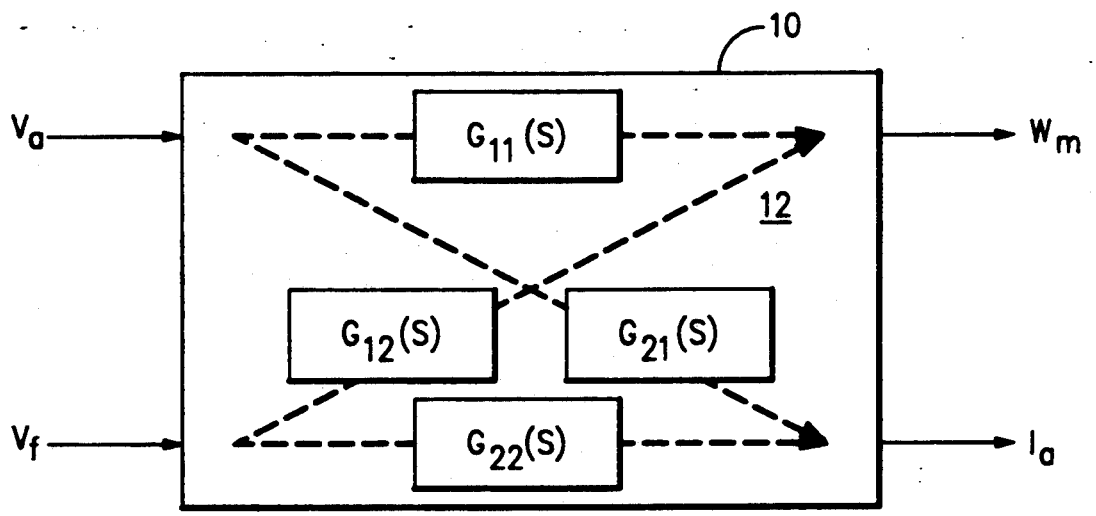
FIG. 2 is a block diagram of a multi-variable coupled system representation of a shunt-wound dc motor showing its particular internal channel transfer functions.

Referring now to FIG. 2, there is shown a block diagram of a multi-variable coupled system representation of a series- or shunt-wound dc motor.

An applied armature voltage $V_a$ and an applied field voltage $V_f$ are input to a motor 10. The physical transformations within the motor 10 may be suitably represented by cross channel transfer functions 12, to produce the motor rotational speed $W_m$ and armature current $I_a$ as outputs.

From an analysis of a series- or shunt-wound dc motor, it can be seen that the motor 10 consists of two first-order and two second-order dynamic systems. Such a motor system may be represented in the s-domain (Laplace transformation) by the transfer functions $G_{11}(s)$, $G_{12}(s)$, $G_{21}(s)$ and $G_{22}(s)$.

These transfer functions 12 are representative of the particular channels of the motor system defined as follows, $$G_{11}(s) = W_m(s)/V_a(s)$$

$$G_{12}(s) = W_m(s)/V_f(s)$$

$$G_{21}(s) = I_a(s)/V_a(s)$$

$$G_{22}(s) = I_a(s)/V_f(s)$$

where $G_{11}(s)$ and $G_{12}(s)$ are first-order systems, and $G_{21}(s)$ and $G_{22}(s)$ are second-order systems. Determination of these transfer functions 12 is analytical as well as experimental.

Figures 3, 3A:
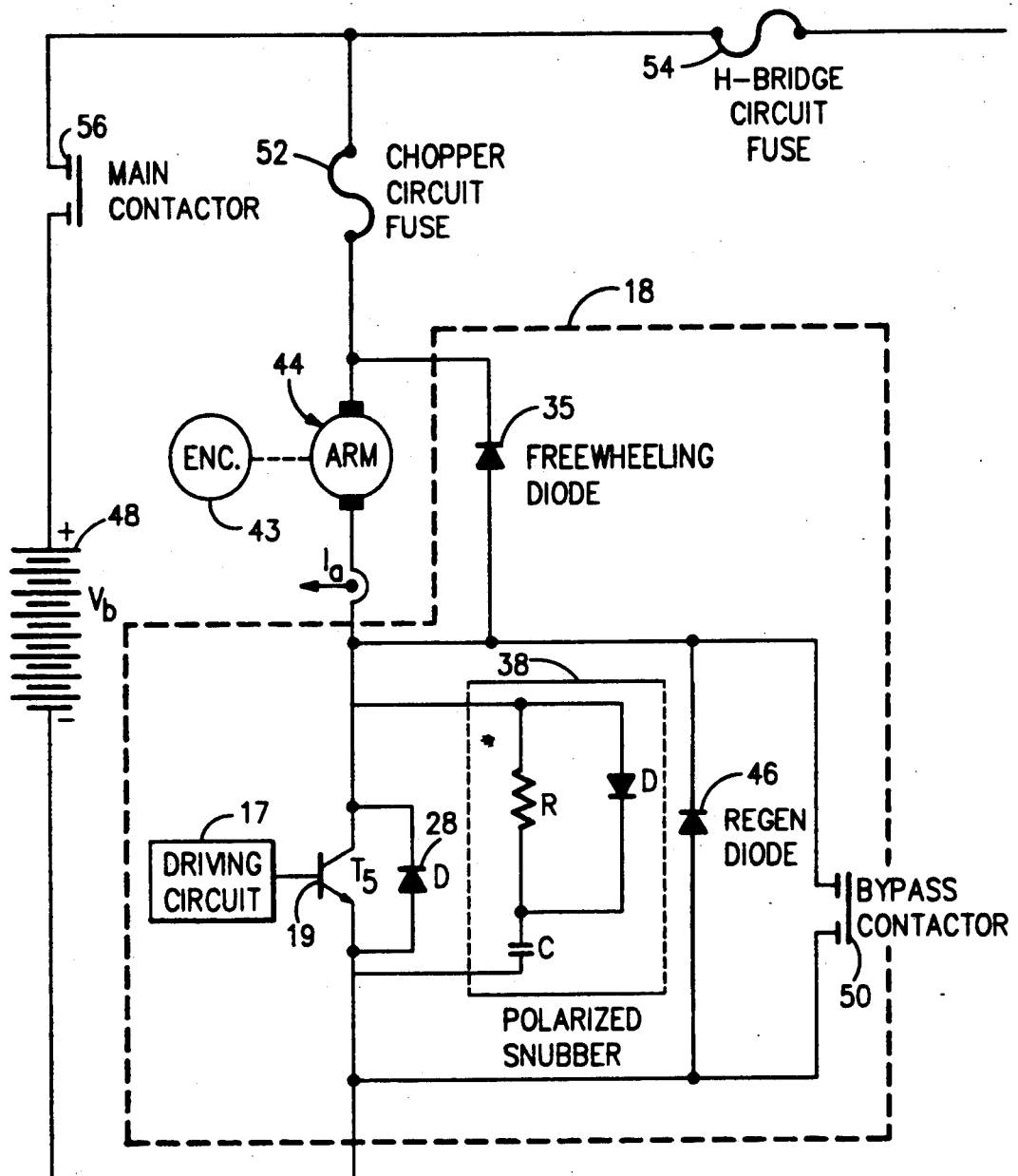
FIG. 3 is a schematic diagram of the preferred embodiment of a dc motor control circuit in accordance with the present invention.
Figure 3B:
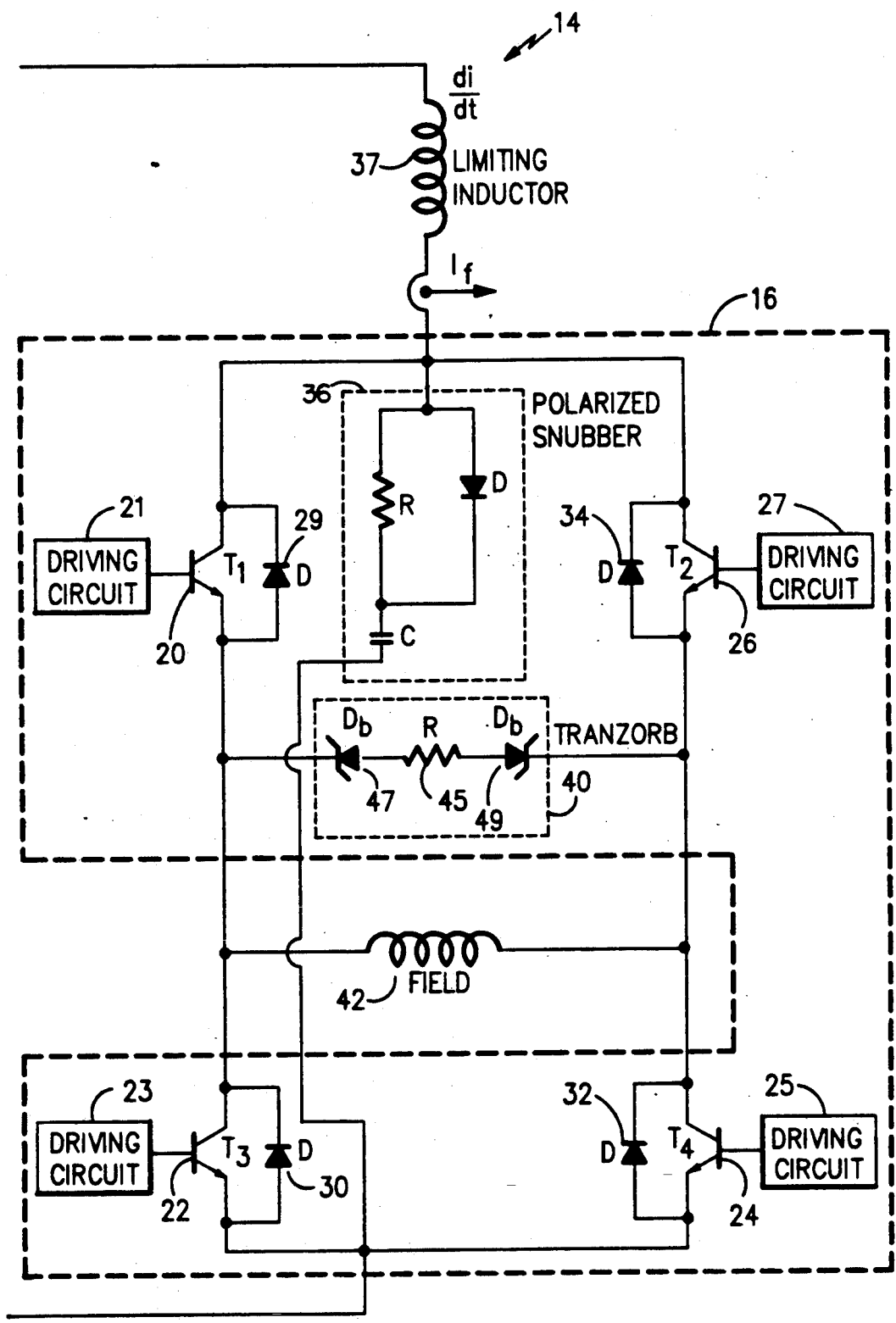

Referring now also to FIG. 3, there is shown a schematic diagram of a dc motor control circuit, shown generally as reference numeral 14, which provides independent control of a series- or shunt-wound dc motor by independently controlling its armature winding 44 and field winding 42. A load (not shown) is driven by the armature 44.

A suitable means for providing a feedback signal proportional to the motor rotational speed is indicated by encoder 43, which is connected to armature 44. It will, of course, be obvious to those skilled in the art that encoder 43 is merely exemplary and that other devices or methods can be employed to perform the same speed sensing function.

The primary components of motor control circuit 14 are a chopper circuit 18 which controls armature winding 44 and an H-Bridge circuit 16 which controls field winding 42. Two pairs of transistors 20, 24 and 26, 22 are connected to field winding 42, as shown.

Power is supplied to motor control circuit 14 by a dc battery 48. A main power contactor 56 is connected to battery 48 and chopper circuit 18 and H-Bridge circuit 16. Main contactor 56 enables system shut down should any system element fail.

A chopper circuit fuse 52 is connected between main contactor 56 and chopper circuit 18 to limit excessive current to chopper circuit 18. An H-Bridge circuit fuse 54 is connected between main contactor 56 and H-Bridge circuit 16 to limit excessive current to H-Bridge circuit 16.

Power regulation through armature winding 44 and field winding 42 is achieved through transistors 19 (in chopper circuit 18) and transistors 20, 22, 24 and 26 (in H-Bridge circuit 16). Control of transistors 19, 20, 22, 24 and 26 is achieved through driving circuits 17, 21, 23, 25 and 27, respectively. Motor rotation direction is dictated by the field winding 42 orientation with respect to the armature winding 44. Field winding 42 orientation is controlled by transistor pairs 22, 26 and 20, 24.

The ON-OFF ratio of transistors 19, 20, 22, 24 and 26 results in an average applied terminal voltage to armature winding 44 and field winding 42, respectively. As such, totally independent and fully variable control of armature winding 44 and field winding 42 is achieved.

Polarized snubber circuits 36 and 38 are provided in H-Bridge circuit 16 and chopper circuit 18 respectively to:
a) absorb switching power losses of transistors 19 (in chopper circuit 18), and transistors 20, 22, 24, 26 (in H-Bridge circuit 16);
b) prevent secondary breakdown due to localized heating effects during turn-on and turn-off of transistors; and
c) prevent spurious turn-on of transistors due to $dV/dt$.

Free wheeling diodes 28, 29, 30, 32 and 34 provide a path for current upon turn-off of transistors 19, 20, 22, 24 and 26, respectively. Another free wheeling diode 35 is provided across armature 44, also to provide a current path when chopper circuit transistor 19 is turned off.

A $dI/dt$ limiting inductor 37 is provided between H-Bridge circuit fuse 54 and H-Bridge circuit 16 to restrict the rate of rise of current through the H-Bridge circuit 16. This $dI/dt$ limiting inductor 37 protects the H-Bridge circuit transistors 20, 22, 24 and 26 from armature voltage spikes. A pair of back to back breakdown diodes 47, 49 and a resistor 45 form a tranzorb 40 across field winding 42 to limit the field voltage.

A regeneration diode 46 connected across transistor 19 provides recirculation of load current back to battery 48 during part of the motor deceleration cycle.

A bypass contactor 50 connected across transistor 19 eliminates the power loss in transistor 19 during sustained high speed travel.

Figure 4:
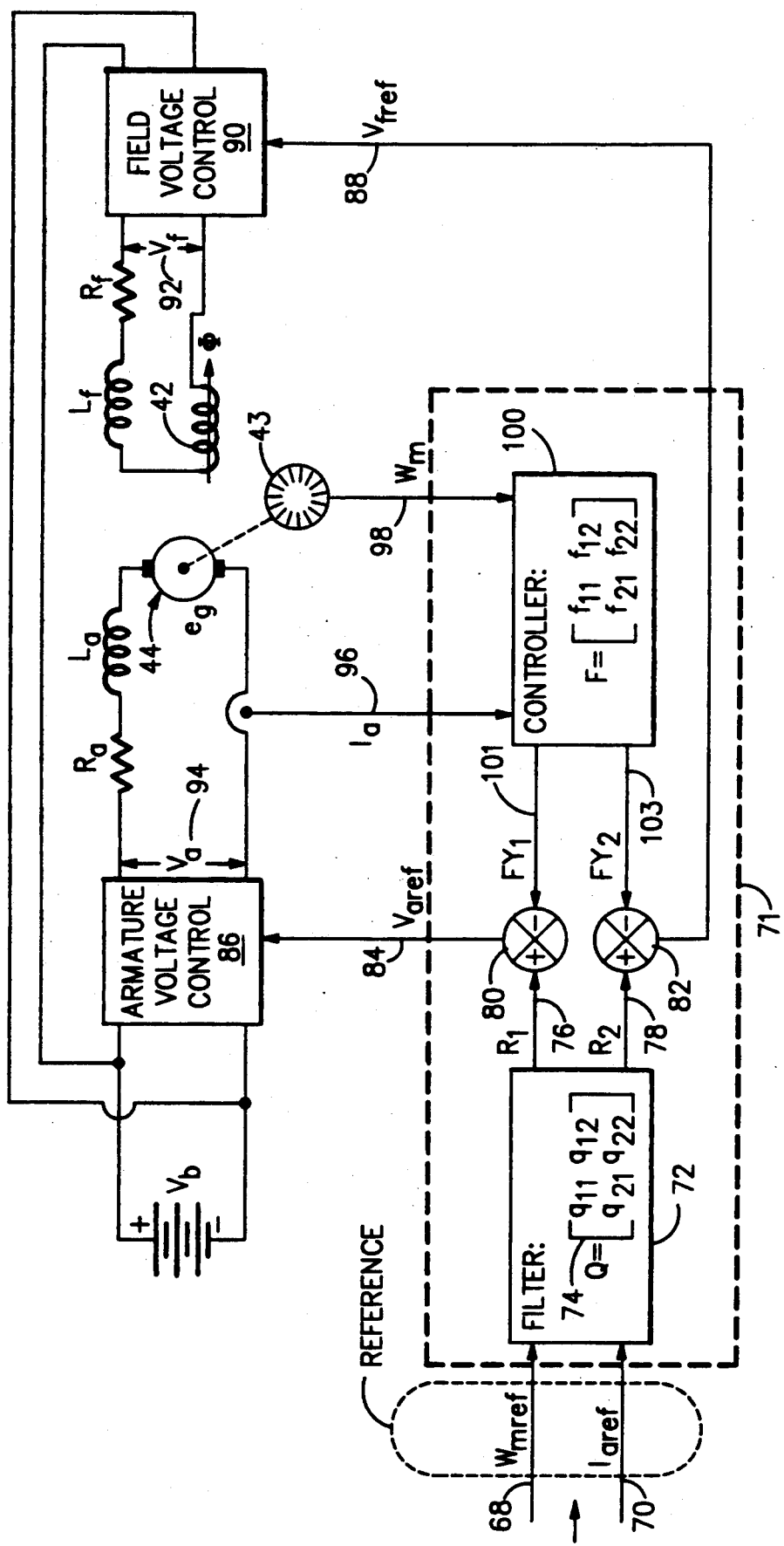
FIG. 4 is a block diagram of the decoupling control system.

Referring now also to FIG. 4, there is shown a schematic block diagram of the separately excited dc motor decoupling control system.

Armature voltage control amplifier 86 adjusts armature voltage $I_a$ 94, which causes the speed of motor 44 to vary. Encoder 43 is connected to motor 44 to sense rotational speed thereof and to generate a continuous signal representative of such new motor rotation speed $W_m$.

A programmable, microprocessor-based decoupling control system is shown generally at reference numeral 71. The functions of control system 71 can be accomplished by a processor such as a Model No. 68HC11 microprocessor manufactured by Motorola Corp. The unfiltered motor rotational speed reference $W_{mref}$ and the unfiltered armature current reference $I_{aref}$ are input via respective lines 68 and 70 to control system 71 and more specifically to a filter 72.

Within filter 72 is a 2×2 filter matrix Q 74. Using basic matrix algebra, the desired motor rotational speed reference $W_{mref}$ and desired armature current reference $I_{aref}$ are transformed to produce filtered input references $R_1$ and $R_2$ applied to lines 76 and 78.

Also within processor control system 71 is a controller 100. Motor outputs of armature current $I_a$ and motor rotational speed $W_m$ are input via respective lines 96 and 98 to controller 100. Within controller 100 is a 2×2 feedback controller matrix F 99. Since 1×2 matrix y consists of signals $I_a$ and $W_m$, by performing basic matrix algebra, controller 100 produces conditioned motor outputs $Fy_1$ and $Fy_2$ applied over lines 101 and 103.

Filtered input references $R_1$ and $R_2$ enter summers 80 and 82 over lines 76 and 78, respectively. Also entering summers 80 and 82 over lines 101 and 103 are conditioned motor outputs $Fy_1$ and $Fy_2$, respectively. Summer 80 produces an armature control voltage $V_{aref}$ applied to line 84. This can be represented mathematically as $V_{aref} = R_1 - Fy_1$. In the same manner, summer 82 produces a field control voltage reference $V_{fref}$ applied to line 88. Together, armature control voltage $V_{aref}$ and field control voltage $V_{fref}$ form the system control effort as a function of filtered input references $R_1$, $R_2$ and conditioned motor outputs $Fy_1$, $Fy_2$. The existing control effort is then applied to the motor 44 and field 42 as follows.

Armature control voltage reference $V_{aref}$ enters an armature voltage control amplifier 86, which amplifies armature control voltage reference $V_{aref}$ to produce armature voltage $V_a$ 94, which is then applied to motor 44, which provides an armature current $I_a$ over line 96. While the motor is generally referred to as reference numeral 44, also included in the motor are armature resistance $R_a$ and armature inductance $L_a$.

Field control voltage reference $V_{fref}$ enters a field voltage control amplifier 90, which amplifies field control voltage reference $V_{fref}$ to produce a field voltage $V_f$ 92, which is then applied to field 42. While the field is generally referred to as reference numeral 42, also included in the field are field resistance $R_f$ and field inductance $L_f$.

Figure 5:
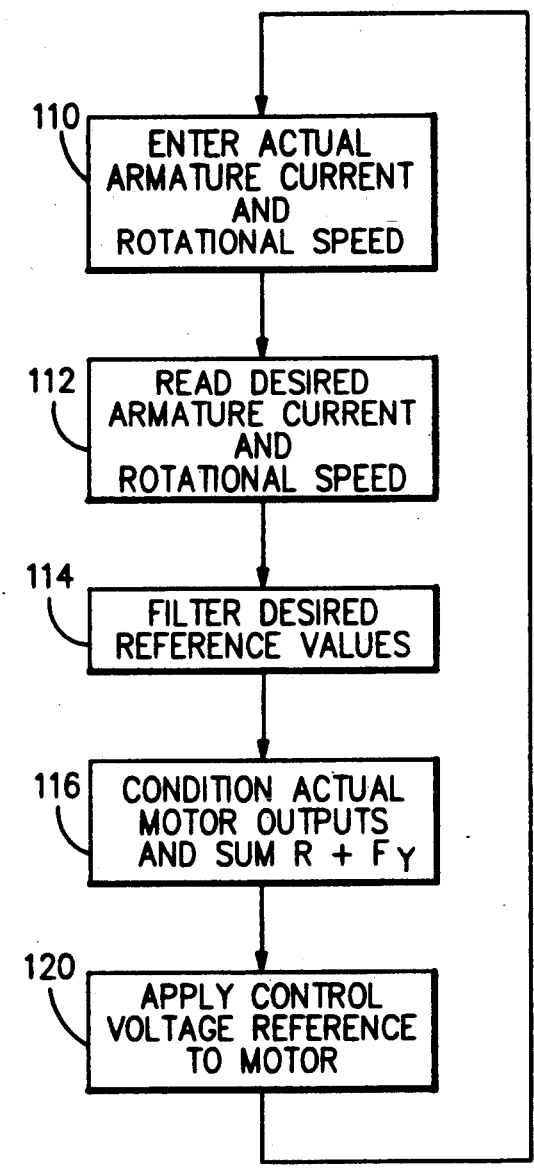
FIG. 5 is a flow chart of decoupling controller operation.

Referring now also to FIG. 5, there is shown a flow chart of decoupling controller operations. It should be noted that the diagram represents only one of a series of repeating cycles.

Data representative of armature current $I_a$ and motor rotational speed $W_m$ is entered, step 110.

Desired output matrix R and motor output matrix y are read, step 112. Desired output matrix R is a matrix of unfiltered input armature current and motor rotational speed references, $I_a$ and $W_m$. Matrix y is the actual motor rotation speed $W_m$ and armature current $I_a$.

Filter matrix Q filters input references, step 114, to result in filtered input references $R_1$ and $R_2$. Feedback controller matrix F, step 116, conditions motor outputs $I_a$, $W_m$ to result in $Fy_1$, $Fy_2$. The applied control voltage (effort) $V_{ref}$ is then calculated (summed) as the difference between filtered input reference R and conditioned motor output Fy. Matrix $V_{ref}$ is an armature control voltage reference $V_{aref}$ and a field control voltage reference $V_{fref}$.

The applied control voltage effort $V_{ref}$ is then applied to motor, step 120, and the cycle repeats.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. Apparatus for decoupling speed and torque of a dc motor having separately excited armature and field windings, said apparatus controlling motor speed of said dc motor independently of torque and torque independently of dc motor speed to the limit of the dc motor commutation curve, in combination, comprising:
   a) a dc motor having an armature, an armature winding and a field winding, said armature and field windings being independently controlled;
   b) armature voltage amplifying means operatively connected to the armature of said motor for varying voltage applied thereto;
   c) armature current sensing means directly connected to said armature voltage amplifying means for sensing armature current;
   d) field voltage amplifying means operatively connected to the field winding of said motor for varying voltage applied thereto;
   e) motor speed sensing means operatively connected to said armature of said dc motor for generating a signal representative of rotational speed of said motor armature; and
   f) decoupling control means being operatively connected to said motor speed sensing means, to said armature voltage amplifying means and to said field voltage amplifying means for independently controlling the motor speed independently of torque and torque independently of said motor speed to the limit of the commutation curve of said dc motor.

2. The decoupling control apparatus of claim 1 further comprising:
   g) first reference signal means operatively connected to said decoupling control means for providing thereto, a first reference signal proportional to desired motor speed.

3. The decoupling control apparatus of claim 2 further comprising:

h) second reference signal means operatively connected to said decoupling control means for providing thereto, a second reference signal proportional to desired armature current.

4. The decoupling control apparatus of claim 3 wherein said decoupling control means comprises filter means and feedback control means.

5. The decoupling control apparatus of claim 4 wherein said decoupling control means further comprises summing means operatively connected to said filter means, to said feedback control means, to said field voltage amplifying means and to said armature voltage amplifying means for providing a control signal to said armature voltage amplifying means and to said field voltage amplifying means.

6. The decoupling control apparatus of claim 4 wherein said armature current sensing means generates a signal applied to said feedback control means.

7. The decoupling control apparatus of claim 1 further comprising:
   g) a power semiconductor operatively connected to said armature for regulating the voltage thereof.

8. The decoupling control apparatus of claim 7 further comprising:
   h) two pairs of semiconductors operatively connected to said field winding for regulating voltage and controlling motor direction.

9. The decoupling control apparatus of claim 1 wherein said motor speed sensing means comprises an encoder.

10. A method for controlling the speed and torque of a dc motor independently of each other to the limit of the commutation curve of said dc motor, comprising the steps of:
   a) generating signals representative of desired motor speed and armature current;
   b) generating signals representative of actual motor speed and armature current;
   c) generating a filtered input reference signal in conjunction with said generated signals of steps (a) and (b);
   d) generating a conditioned motor output signal responsive to said generated signals of steps (a) and (b); and
   e) controlling dc motor speed and torque independently of each other to the limit of said commutation curve of said dc motor as a function of said filtered input reference signal and said conditioned motor output signal.

* * * * *